United States Patent
Yu et al.

(10) Patent No.: US 8,076,916 B2
(45) Date of Patent: Dec. 13, 2011

(54) POWER SUPPLY MODULE

(75) Inventors: Shun-Jung Yu, Taipei (TW);
Yuan-Yung Fan, Taipei (TW);
Kai-Hsiang Liang, Taipei (TW)

(73) Assignee: Inventec Corporation, Taipei (TW)

( * ) Notice: Subject to any disclaimer, the term of this patent is extended or adjusted under 35 U.S.C. 154(b) by 792 days.

(21) Appl. No.: 12/170,100

(22) Filed: Jul. 9, 2008

(65) Prior Publication Data
US 2009/0256538 A1 Oct. 15, 2009

(30) Foreign Application Priority Data
Apr. 11, 2008 (TW) ................................ 97113275 A

(51) Int. Cl.
*G05F 1/40* (2006.01)
(52) U.S. Cl. ...................................................... 323/282
(58) Field of Classification Search .................. 323/266, 323/268, 282–285
See application file for complete search history.

(56) References Cited

U.S. PATENT DOCUMENTS

| | | | | |
|---|---|---|---|---|
| 5,770,940 A * | 6/1998 | Goder | ........................... | 323/282 |
| 6,661,210 B2 * | 12/2003 | Kimball et al. | ............... | 323/268 |
| 6,828,762 B2 * | 12/2004 | Brkovic | ........................ | 323/222 |
| 6,965,220 B2 * | 11/2005 | Kernahan et al. | ............. | 323/283 |
| 7,095,220 B2 * | 8/2006 | Kernahan | ...................... | 323/300 |
| 7,157,889 B2 * | 1/2007 | Kernahan et al. | ............. | 323/268 |
| 2006/0261794 A1 * | 11/2006 | May | ............................. | 323/283 |

* cited by examiner

*Primary Examiner* — Adolf Berhane
(74) *Attorney, Agent, or Firm* — CKC & Partners Co., Ltd.

(57) ABSTRACT

A power supply module includes an inductor circuit, a switch circuit, a sensor circuit, and a controller. The inductor circuit includes an inductor and a voltage feedback wire returning the terminal voltage of the inductor. The switch circuit is electrically connected to the inductor circuit for driving the inductor circuit. The sensor circuit is electrically connected to the switch circuit and the voltage feedback wire, in which the sensor circuit controls the switch circuit and generates a current feedback signal according to the terminal voltage of the inductor. The controller is electrically connected to the sensor circuit, in which the controller controls the sensor circuit according to the current feedback signal.

6 Claims, 2 Drawing Sheets

US 8,076,916 B2

POWER SUPPLY MODULE

RELATED APPLICATIONS

This application claims priority to Taiwan Application Serial Number 97113275, filed Apr. 11, 2008, which is herein incorporated by reference.

BACKGROUND

1. Field of Invention

The present invention relates to a power supply module. More particularly, the present invention relates to a motherboard power supply module.

2. Description of Related Art

Generally speaking, a conventional switching power supply module includes an input rectification circuit, an input filter circuit, a dc converter, an output filtering circuit, and a pulse width modulation circuit. The input rectification circuit and the input filter circuit rectifies and filters an ac input current into a rough dc current, then the rough dc current is converted to a rough square wave. After that, the voltage level of the converted square wave is tuned to the required level, and the output filtering circuit generates a more precise output dc current accordingly.

Because the power signal provided by the power supply module needs to be stable, the power signal is continuously checked to make sure it is stable. For this reason, the power signal is returned to the controller of the power supply module, checked by the controller and tuned accordingly. To tune the power signal, the controller usually includes a pulse width modulation circuit, which compares the power signal and a reference signal, and tunes the duty cycle of the pulse width modulation signal, which controls the volume of the power signal.

However, in order to detect the power signal, the conventional power supply module usually requires numerous voltage feedback wires connected to the controller, which makes the wires located on the motherboard more complicated, and the production period of the motherboard becomes longer as a result. Besides, a larger motherboard is required to accommodate the numerous wires, which makes this kind of motherboard incompatible with small electronic devices.

Therefore, there is a need for a new power supply module with a simplified feedback wire structure and a smaller circuit area.

SUMMARY

According to one embodiment of the preset invention, a power supply module is disclosed. The power supply module includes an inductor circuit, a switch circuit, a sensor circuit, and a controller. The inductor circuit includes an inductor and a voltage feedback wire returning the terminal voltage of the inductor. The switch circuit is electrically connected to the inductor circuit to drive the inductor circuit. The sensor circuit is electrically connected to the switch circuit and the voltage feedback wire, in which the sensor circuit controls the switch circuit and generates a current feedback signal according to the terminal voltage of the inductor. The controller is electrically connected to the sensor circuit, in which the controller controls the sensor circuit according to the current feedback signal.

According to another embodiment of the present invention, a power supply module includes a plurality of inductor circuits, a plurality of switch circuits, a plurality of sensor circuit and a controller. Each of the inductor circuits includes an inductor and a voltage feedback wire, in which the voltage feedback wire of each inductor circuit returns the terminal voltage of each inductor. The switch circuits drive the inductor circuits. The sensor circuits are electrically connected to the switch circuits and the voltage feedback wires, in which the sensor circuits control the switch circuits and generate at least one current feedback signal according to the inductor terminal voltages of the inductor. The controller controls the sensor circuits according to the current feedback signal.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
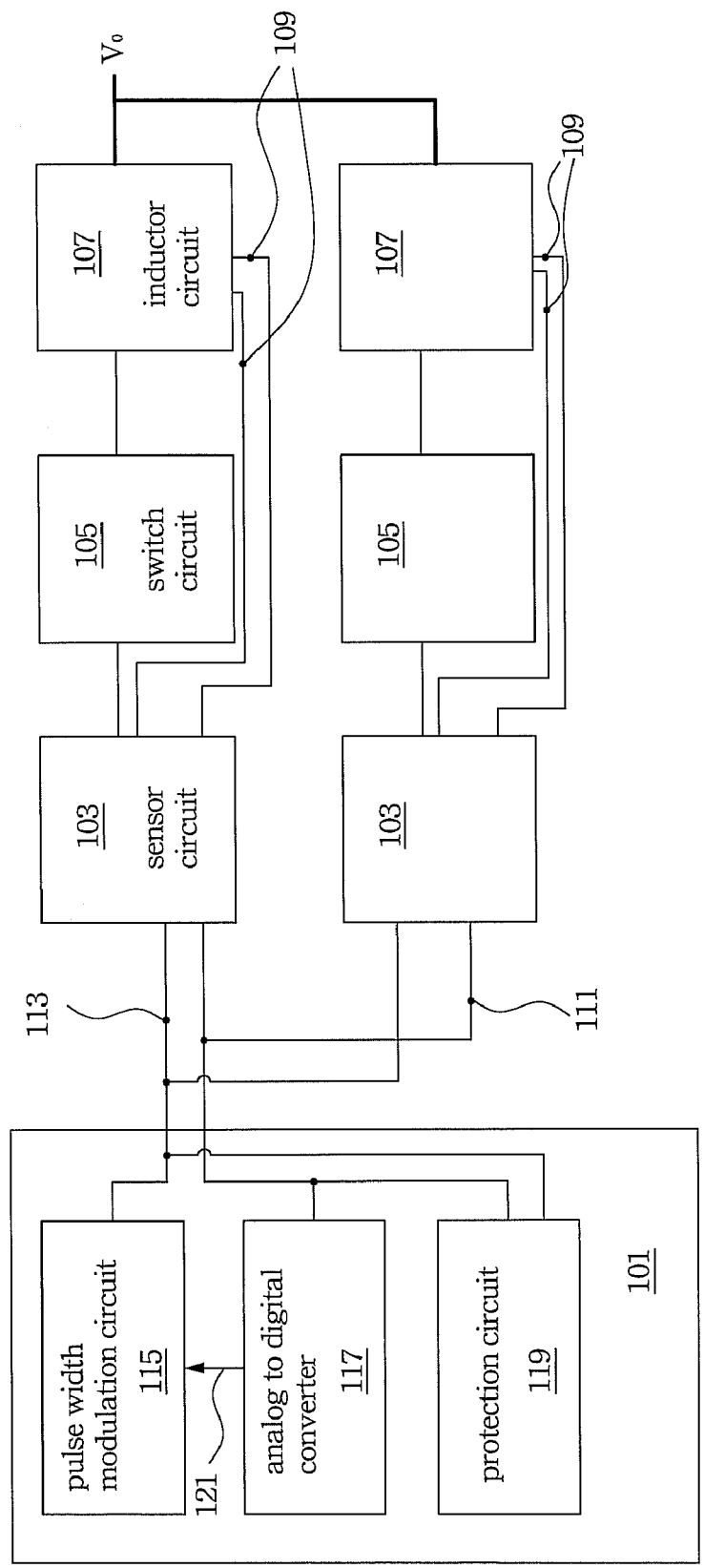
FIG. 1 shows the block diagram of the power supply module according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The power supply module of the embodiments shown below can reduce the voltage feedback wires such that the circuit area and the metal layer number required by the power supply module can be reduced.

FIG. 1 shows the block diagram of the power supply module according to one embodiment of the present invention. The power supply module includes an inductor circuit 107, a switch circuit 105, a sensor circuit 103, and a controller 101. The inductor circuit 107 includes an inductor and a voltage feedback wire 109 returning the terminal voltage of the inductor. The switch circuit 105 is electrically connected to the inductor circuit 107 and drives the inductor circuit 107. The sensor circuit 103 is electrically connected to the switch circuit 105 and the voltage feedback wires 109, in which the sensor circuit 103 controls the switch circuit 105 and generates a current feedback signal 111 according to the terminal voltage of the inductor belonging to the inductor circuit 107. The controller 101 is electrically connected to the sensor circuit 103, in which the controller 101 controls the sensor circuit 103 according to the current feedback signal 111.

Because the voltage feedback wires 109 are not electrically connected to the controller 101 directly, but connected to the corresponding sensor circuit 103 previously, then the sensor circuit 103 returns the current feedback wire 111 to the controller 101. Hence, the controller 101 receives merely one current feedback wire 111, and the number of feedback wires connected to the controller 101 can be reduced, which further reduces the circuit area of the power supply module.

The controller 101 includes the analog to digital converter 117 and the pulse width modulation circuit 115. The analog to digital converter 117 converts the current feedback signal 111 into a digital current signal 121. The pulse width modulation circuit (PWN) 115 converters the amplitude data of the digital current signal 121 into pulse width. In other words, the pulse width modulation circuit 115 tunes the pulse width of the pulse width modulation signal 113 according to the digital current signal 121. The pulse width modulation circuit 115 usually compares the digital current signal 121 and a reference signal, and generates the pulse width modulation signal 113 according to the compare result.

The controller 101 further includes the protection circuit 119 which detects and determines if the current feedback signal 111 and the pulse width modulation signal 113 are within the required range. For example, the protection circuit 119 detects the voltage value and the temperature of the current feedback signal 111 and the pulse width modulation signal 113. When the voltage value and the temperature of the current feedback signal 111 and the pulse width modulation signal 113 are within the normal range, the protection circuit 119 outputs a signal indicating that the circuit state is normal, and the power supply module can keep operating; otherwise the protection circuit 119 outputs a signal indicating that the circuit state is abnormal, and the power supply module stops operating.

Figure 2:
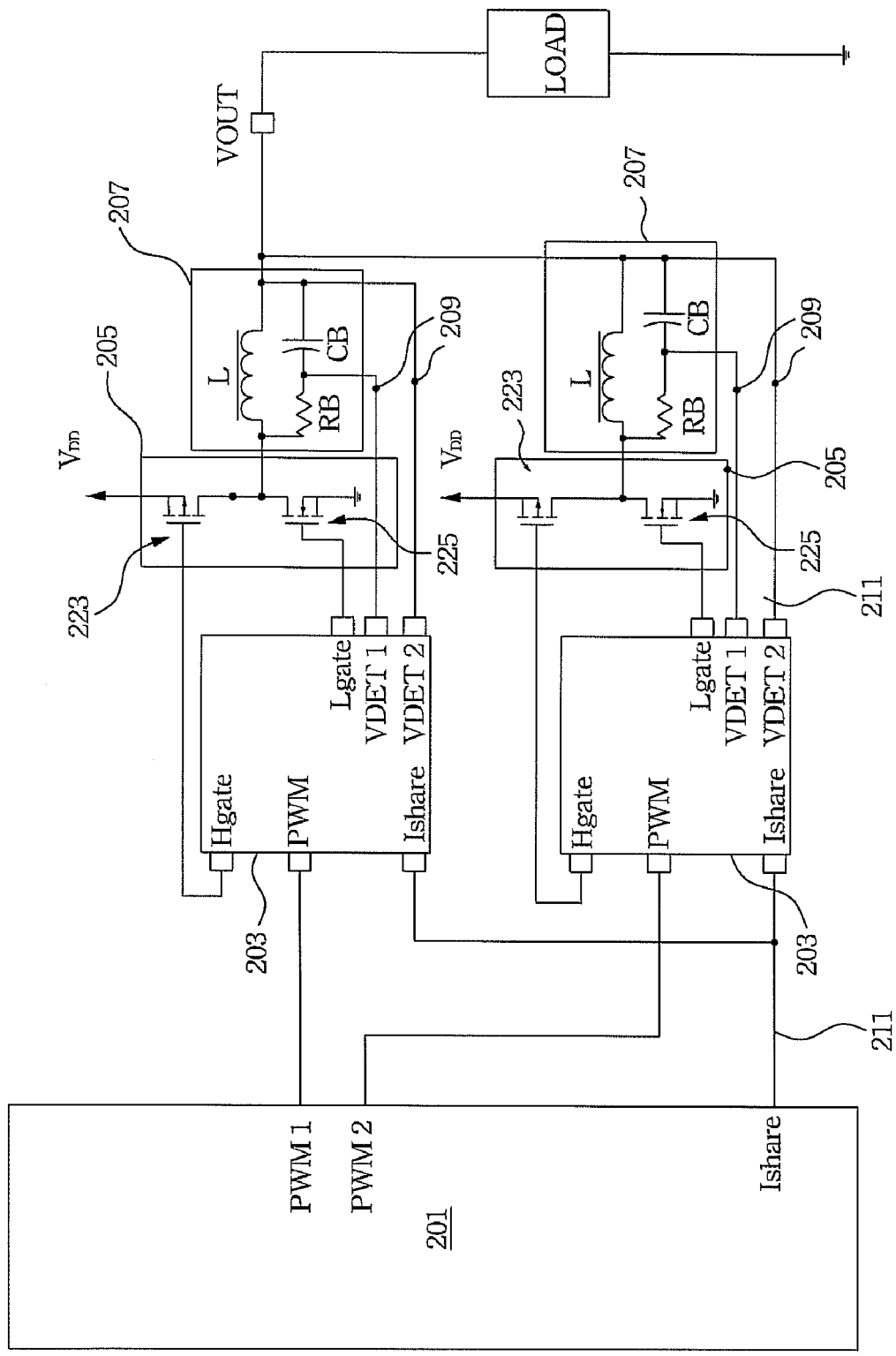
FIG. 2 shows the block diagram of the power supply module according to another embodiment of the present invention.

FIG. 2 shows the block diagram of the power supply module according to another embodiment of the present invention. The power supply module includes the inductor circuit 207, the switch circuit 205, the sensor circuit 203, and the controller 201.

The inductor circuit 207 includes the inductor L, the resistor RB, the capacitor CB, and the voltage feedback wires 209, in which each inductor L has individual current phase. The resistor RB is electrically connected to the inductor L. The capacitor CB has two ends electrically connected to the resistor RB and the inductor L respectively, in which the voltage drop across the capacitor CB is returned to the voltage detecting terminal VDET 1 and VDET 2 of the sensor circuit 203 by the voltage feedback wires 209.

When the impedances of the inductor L, the capacitor CB and the resistor RB match, the voltage drop across the capacitor CB equals the voltage drops across the inductor L (L/DCR=RB×CB, in which the DRC represents the DC resistance of the inductor L), which means that the voltage feedback wires 209 return the terminal voltage of the inductor L to the sensor circuit 203 indeed.

The sensor circuit 203 is electrically connected to the switch circuit 205 and the voltage feedback wires 209. To balance the current volume of the several inductors L, the sensor circuit 203 controls the switch circuit 205 and generates the current feedback signal 211 according to the detected terminal voltage of the inductor L, in which the current feedback signal 211 is passed to the current feedback terminal Ishare of the controller 201. With the current feedback signal 211, the controller 201 can know the current volume of the inductor L and generate the pulse width modulation signal accordingly. The pulse width modulation signal is then passed from the terminal PWM1 or the terminal PWM2 of the controller 201 to the receiving terminal PWM of the sensor circuit 203 for further tuning the current volume of the inductor L.

The voltage feedback wires 209 first return the terminal voltage of the inductor L to the sensor circuit 203 and then the sensor circuit 203 generates the current feedback signal 211 and passes the current feedback signal 211 to the controller 201. Hence, the controller 201 receives only one current feedback signal 211, and the number of feedback wires connected to the controller 201 is reduced, the circuit area and the metal layer number required for the power supply module is reduced as a result. Besides, with the current feedback signal 211, the controller 201 can further balance the current volume of various Inductors L through the sensor circuits 203 and the switch circuits 205.

The switch circuit 205 is electrically connected to the inductor circuit 207 to drive the inductor circuit 207. The switch circuit 205 includes the field effect transistor 223 and field effect transistor 225. The gate of the field effect transistor 223 is electrically connected to the voltage terminal Hgate of the sensor circuit 203, the source of the field effect transistor 223 is electrically connected to the supply voltage VDD. The gate of the field effect transistor 225 is electrically connected to the voltage terminal Lgate of the sensor circuit 203, the source of the field effect transistor 225 is electrically connected to the ground voltage. The drain of the field effect transistor 223 and the field effect transistor 225 are electrically connected to the inductor L. To balance the current volume of the inductors L, the sensor circuit 203 charge/discharge the inductor L by conducting/turning off the field effect transistor 223 and field effect transistor 225 according to the detected terminal voltage of the inductor L.

According to the above embodiments, the voltage feedback wires return the inductor terminal voltages to the sensor circuits, then the sensor circuits generate and return one current feedback signal to the controller. Hence, the controller receives only one current feedback signal, which reduces the required feedback wire number, the required circuit area and the required metal layer number.

In addition, because the controller receives only one current feedback signal, the controller doesn't need to add the current volume of each inductor, so the adder is no longer required for the controller, so the controller is also simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply module, comprising:
   an inductor circuit including an inductor and a voltage feedback wire returning the terminal voltage of the inductor;
   a switch circuit electrically connected to the inductor circuit for driving the inductor circuit;
   a sensor circuit electrically connected to the switch circuit and the voltage feedback wire, wherein the sensor circuit controls the switch circuit and generates a current feedback signal according to the terminal voltage of the inductor; and
   a controller electrically connected to the sensor circuit, wherein the controller controls the sensor circuit according to the current feedback signal, wherein the controller comprises:
   an analog to digital converter for converting the current feedback signal into a digital current signal; and
   a pulse width modulation circuit for tuning the pulse width of a pulse width modulation signal according to the digital current signal.

2. The power supply module as claimed in claim 1, wherein the inductor circuit further comprises:
   a resistor electrically connected to the inductor; and
   a capacitor having two ends electrically connected to the resistor and the inductor respectively, wherein the voltage drop across the capacitor is returned to the sensor circuit by the voltage feedback wire.

3. The power supply module as claimed in claim 1, wherein the controller further comprises a protection circuit detecting and determining if the current feedback signal and the pulse width modulation signal are within the required range.

4. The power supply module as claimed in claim 1, wherein the switch circuit comprises a field effect transistor having a gate electrically connected to the sensor circuit and a drain electrically connected to the inductor.

5. A power supply module, comprising:
   a plurality of inductor circuits, each including an inductor and a voltage feedback wire, wherein the voltage feedback wire of each inductor circuit returns the terminal voltage of corresponding inductor;
   a plurality of switch circuits for driving the inductor circuits;
   a plurality of sensor circuits electrically connected to the switch circuits and the voltage feedback wires, wherein the sensor circuits control the switch circuits and generate a current feedback signal according to the inductor terminal voltages of the inductor circuits; and
   a controller controlling the sensor circuits according to the current feedback signal, wherein the controller comprises:
     an analog to digital converter for converting the current feedback signal into a digital current signal; and
     a pulse width modulation circuit for tuning the pulse width of a pulse width modulation signal for tuning the current volume of the inductor.

6. The power supply module as claimed in claim 5, wherein each of the inductor circuits further comprises:
   a resistor electrically connected to the inductor; and
   a capacitor having two ends electrically connected to the resistor and the inductor respectively, wherein the voltage drop across the capacitor is returned to the sensor circuit through the voltage feedback wire.

* * * * *